(12) United States Patent
Rodriguez Bravo et al.

(10) Patent No.: US 12,160,749 B2
(45) Date of Patent: Dec. 3, 2024

(54) SERVICE SET IDENTIFIER ALIAS SECURITY AND TRACKING

(71) Applicant: KYNDRYL, INC., New York, NY (US)

(72) Inventors: Cesar Augusto Rodriguez Bravo, Alajuela (CR); Mohamed Zouhaier Ramadhane, Azcapotzalco (MX); David Alonso Campos Batista, Heredia (CR); Desilda Toska, Alajuela (CR)

(73) Assignee: Kyndryl, Inc., New York, NY (US)

( * ) Notice: Subject to any disclaimer, the term of this patent is extended or adjusted under 35 U.S.C. 154(b) by 518 days.

(21) Appl. No.: 17/513,485

(22) Filed: Oct. 28, 2021

(65) Prior Publication Data

US 2023/0135589 A1    May 4, 2023

(51) Int. Cl.
| | |
|---|---|
| G06F 7/04 | (2006.01) |
| G06F 15/16 | (2006.01) |
| H04L 29/06 | (2006.01) |
| H04W 12/02 | (2009.01) |
| H04W 12/06 | (2021.01) |
| H04W 12/73 | (2021.01) |
| H04W 12/75 | (2021.01) |
| H04L 101/622 | (2022.01) |

(52) U.S. Cl.
CPC ........... *H04W 12/73* (2021.01); *H04W 12/02* (2013.01); *H04W 12/06* (2013.01); *H04W 12/75* (2021.01); *H04L 2101/622* (2022.05)

(58) Field of Classification Search
CPC .............................. H04W 12/73; H04W 12/06
USPC .......................................................... 726/3
See application file for complete search history.

(56) References Cited

U.S. PATENT DOCUMENTS

| | | |
|---|---|---|
| 8,531,289 B2 | 9/2013 | Scalisi et al. |
| 9,338,759 B2 | 5/2016 | Chowdhury et al. |
| 10,178,530 B2 | 1/2019 | Forood et al. |
| (Continued) | | |

FOREIGN PATENT DOCUMENTS

| | | |
|---|---|---|
| EP | 2671373 | 12/2013 |
| KR | 100731642 | 12/2016 |
| WO | 2015042917 | 4/2015 |

OTHER PUBLICATIONS

Anonymous, "Private Wi-Fi SSID—Pre Paid PP SSID Cards", https://priorart.ip.com/IPCOM/000261609, IP.com PAD, Mar. 20, 2020, 2 pages.
Oliveira et al., "Mobile Device Detection Through WiFi Probe Request Analysis", IEEE Access, Jun. 27, 2019, 10 pages.
Sun et al., "Mobile Devise Passive Localization Based on IEEE 802.11 Probe Request Frames", Hindawi, Jun. 19, 2017, 11 pages.

(Continued)

*Primary Examiner* — Brandon Hoffman
*Assistant Examiner* — Samuel Ambaye
(74) *Attorney, Agent, or Firm* — Dan Housley; Andrew M. Calderon; Calderon Safran & Wright P.C.

(57) ABSTRACT

A method includes generating, by a computing device, SSID aliases; propagating, by the computing device, the SSID aliases to access points; receiving, by the computing device, data from an access point, the data including a selected SSID alias and a media access control (MAC) address of a user device; creating, by the computing device, a record containing the selected SSID alias and the MAC address of the user device; propagating, by the computing device, the selected SSID alias to remaining access points; and sending, by the computing device, a message to the access points to delete the selected SSID alias after a time period.

20 Claims, 5 Drawing Sheets

(56) References Cited

U.S. PATENT DOCUMENTS

| | | | |
|---|---|---|---|
| 10,292,013 B2 | 5/2019 | Frank et al. | |
| 10,292,047 B1 | 5/2019 | Jiang et al. | |
| 10,356,457 B1 | 7/2019 | Greenfield | |
| 11,109,310 B1* | 8/2021 | Crespi | H04W 24/02 |
| 2014/0337950 A1 | 11/2014 | Yang et al. | |
| 2015/0141005 A1* | 5/2015 | Suryavanshi | H04W 12/06 |
| | | | 455/434 |
| 2016/0127375 A1* | 5/2016 | Eluard | H04W 12/50 |
| | | | 726/3 |
| 2017/0346853 A1 | 11/2017 | Wyatt et al. | |
| 2018/0167389 A1 | 6/2018 | Zou et al. | |
| 2021/0014234 A1* | 1/2021 | Kwatra | H04W 48/20 |

OTHER PUBLICATIONS

Vishwa Modi, "Detection of Rogue Access Point to Prevent Evil Twin Attack in Wireless Network", IJERT, Apr. 4, 2017, 4 pages.
Anonymous, "WatchGuard Products & Services", https://www.watchguard.com/wgrd-products, downloaded Oct. 28, 2021, 3 pages.
Célestin Matte. Wi-Fi tracking : Fingerprinting attacks and countermeasures. Networking and Internet Architecture [cs.NI]. Universite de Lyon, 2017. English. NNT: 2017LYSEI114. tel-01921596, 176 pages.
Unknown, "Watch Guard Help Center", https://www.watchguard.com/help/docs/help-center/en-US/Content/Search.html?q=ssid, downloaded Oct. 28, 2021, 3 pages.
Null Byte, "Track Devices via Probe Frames with Probequest [Tutorial]", https://www.youtube.com/watch?v=Z8RHMUSYTIA, Jul. 26, 2018, 4 pages.

\* cited by examiner

SERVICE SET IDENTIFIER ALIAS SECURITY AND TRACKING

BACKGROUND

Aspects of the present invention relate generally to computing devices and, more particularly, to service set identifier (SSID) alias security and tracking.

Computing devices connect to the Internet using wireless networks. A wireless network is configurable to accommodate multiple users. In this way, multiple users use the same wireless network.

SUMMARY

In a first aspect of the invention, there is a computer-implemented method including: generating, by a computing device, SSID aliases; propagating, by the computing device, the SSID aliases to access points; receiving, by the computing device, data from an access point, the data including a selected SSID alias and a media access control (MAC) address of a user device; creating, by the computing device, a record containing the selected SSID alias and the MAC address of the user device; propagating, by the computing device, the selected SSID alias to remaining access points; and sending, by the computing device, a message to the access points to delete the selected SSID alias after a time period.

In another aspect of the invention, there is a computer program product including one or more computer readable storage media having program instructions collectively stored on the one or more computer readable storage media. The program instructions are executable to: generate SSID aliases randomly; propagate the SSID aliases to access points; receive data from an access point, the data including a selected SSID alias and a media access control (MAC) address of a user device; create a record containing the selected SSID alias and the MAC address of the user device; propagate the selected SSID alias to remaining access points; and send a message to the access points to delete the selected SSID alias after a time period.

In another aspect of the invention, there is system including a processor, a computer readable memory, one or more computer readable storage media, and program instructions collectively stored on the one or more computer readable storage media. The program instructions are executable to: generate SSID aliases randomly; propagate the SSID aliases to access points; receive data from an access point, the data including a selected SSID alias and a media access control (MAC) address of a user device; create a record containing the selected SSID alias and the MAC address of the user device; propagate the selected SSID alias to remaining access points; receive SSID alias usage data from the access points; and send a message to the access points to delete the selected SSID alias after a time period.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
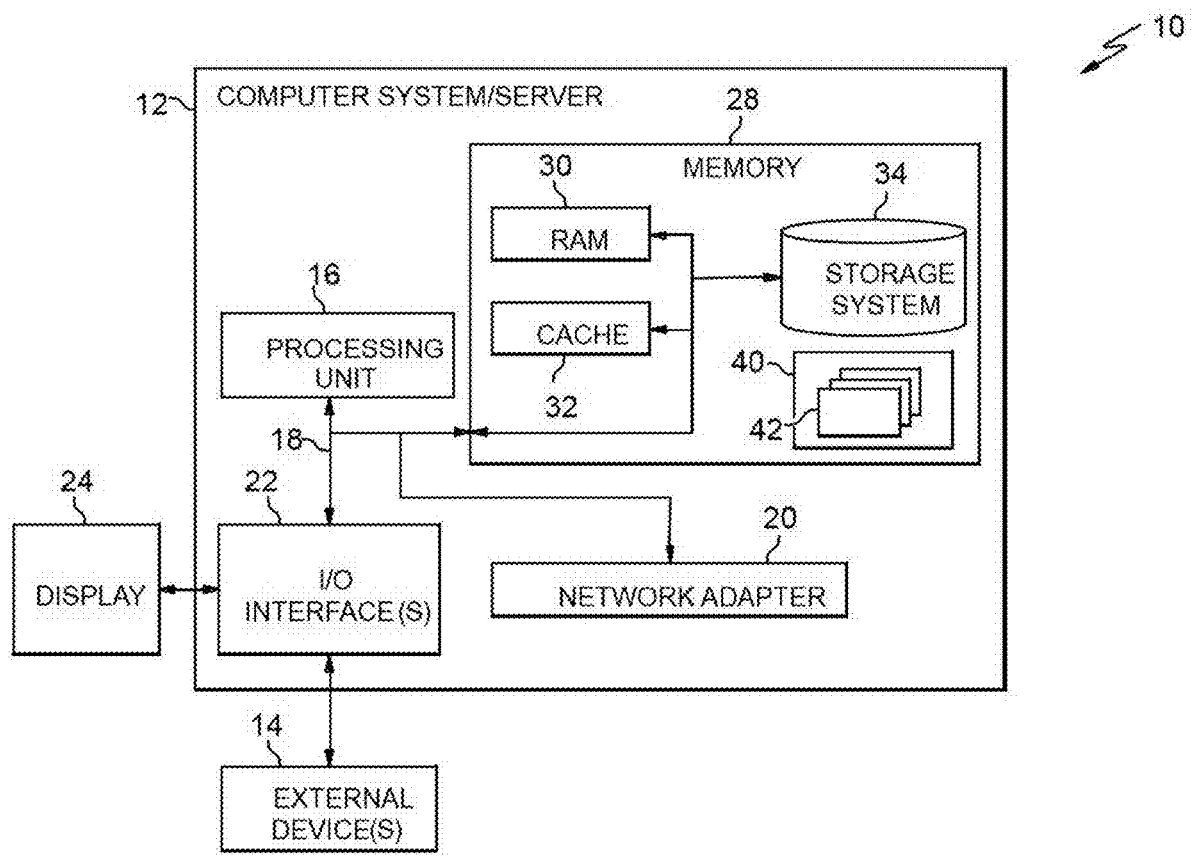
FIG. 1 depicts a cloud computing node according to an embodiment of the present invention.

Aspects of the present invention relate generally to computing devices and, more particularly, to service set identifier (SSID) alias security and tracking. According to aspects of the invention, the systems and processes prevent various wireless network attacks by generating unique SSID aliases for a SSID of a wireless network. In embodiments, the systems and processes cause to display the SSID aliases on a user device. In embodiments, in response to receiving a selection of a SSID alias from the user device, the systems and processes hide this SSID alias from other users. In embodiments, the systems and processes assign the SSID alias to the user device and register the MAC addresses of the user device together with the SSID alias. In this manner, implementations of the prevent another user from joining the wireless network by selecting the same SSID alias (since the SSID alias is hidden), thereby preventing another user from impersonating the user.

In embodiments, the systems and processes allow for a computer-implemented process for protecting networks using SSID information. In embodiments, in response to a receiving a request from a new device to find available networks, the systems and processes display a configurable number of generated random SSID aliases. Additionally, in response to a connection by the new device attempting to connect to a particular SSID alias from among the configurable number of generated random SSID aliases, the systems and processes assign the particular SSID alias to a media access control (MAC) address of the new device as a first device identifying the first device by the particular SSID alias. In addition, in response to assigning the particular SSID alias to the first device, the systems and processes hide the particular SSID alias to prevent another device from attempting a same connection. Further, the systems and processes send the MAC address and the particular SSID alias to a centralized network management system to perform a determination that the MAC address and the particular SSID alias are new to the centralized network management system, thereby creating a new entry by the centralized network management system. Additionally, in response to a determination by the centralized network management system of at least one of the MAC addresses and the particular SSID alias exists, associating new information with the first device by the centralized network management system. This will allow the system to detect a potential change of the user device MAC address. In addition, the systems and processes send the hidden SSID alias to other access points managed by the centralized network management system, which causes the other access points to add the hidden SSID alias to a list of hidden SSID aliases. In further embodiments, the systems and processes receive from access points by the centralized network management system a list of connected devices and respective SSID aliases for each device connection. In embodiments, in response to receiving data by the centralized network management system from a plurality of access points, the systems and processes analyze a first information including hidden SSID aliases and MAC addresses, along with an access point of connection for a user, to identify the user and trace movement of the user. In response to identifying unnecessary SSID aliases, the systems and processes compute a predetermined time to delete the unnecessary SSID aliases by using second information including a predetermined strategy, a configurable set of predetermined business rules, usage, data privacy law, and a predetermined threshold of a number of SSID aliases per access point. In embodiments, in response to expiration of the predetermined time, the systems and processes send, by the centralized network management system, a message to the plurality of access points to delete at least one of the SSID aliases and a specific list of SSID aliases. In further embodiments, in response to deletion of at least one of all SSID aliases and the specific list of SSID aliases, the systems and processes prohibit serving the at least one of all SSID aliases and the specific list of SSID aliases by the plurality of access points.

Implementations of the invention allow for a practical application of preventing attacks on wireless networks. In embodiments, the systems and processes described herein generate SSID aliases for a wireless network in response to receiving a request from a user device to connect to an access point of the wireless network. In embodiments, the systems and processes display the SSID aliases on the user device. In response to receiving a selection of a SSID alias from the user device, the systems and processes assign the selected SSID alias to the user device as an identifier. Specifically, the systems and processes register the MAC addresses of the user device together with the selected SSID alias. In embodiments, the systems and processes hide the selected SSID alias from additional user devices. In further embodiments, the systems and processes send the selected SSID alias to other access points in the wireless network. By providing unique SSID aliases, hiding a SSID alias upon selection, and registering the selected SSID alias with a user device, the systems and processes provide the practical application of preventing another user device from impersonating the user device to attack the wireless networks.

It should be understood that, to the extent implementations of the invention collect, store, or employ personal information provided by, or obtained from, individuals (for example, a tracking a user device), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
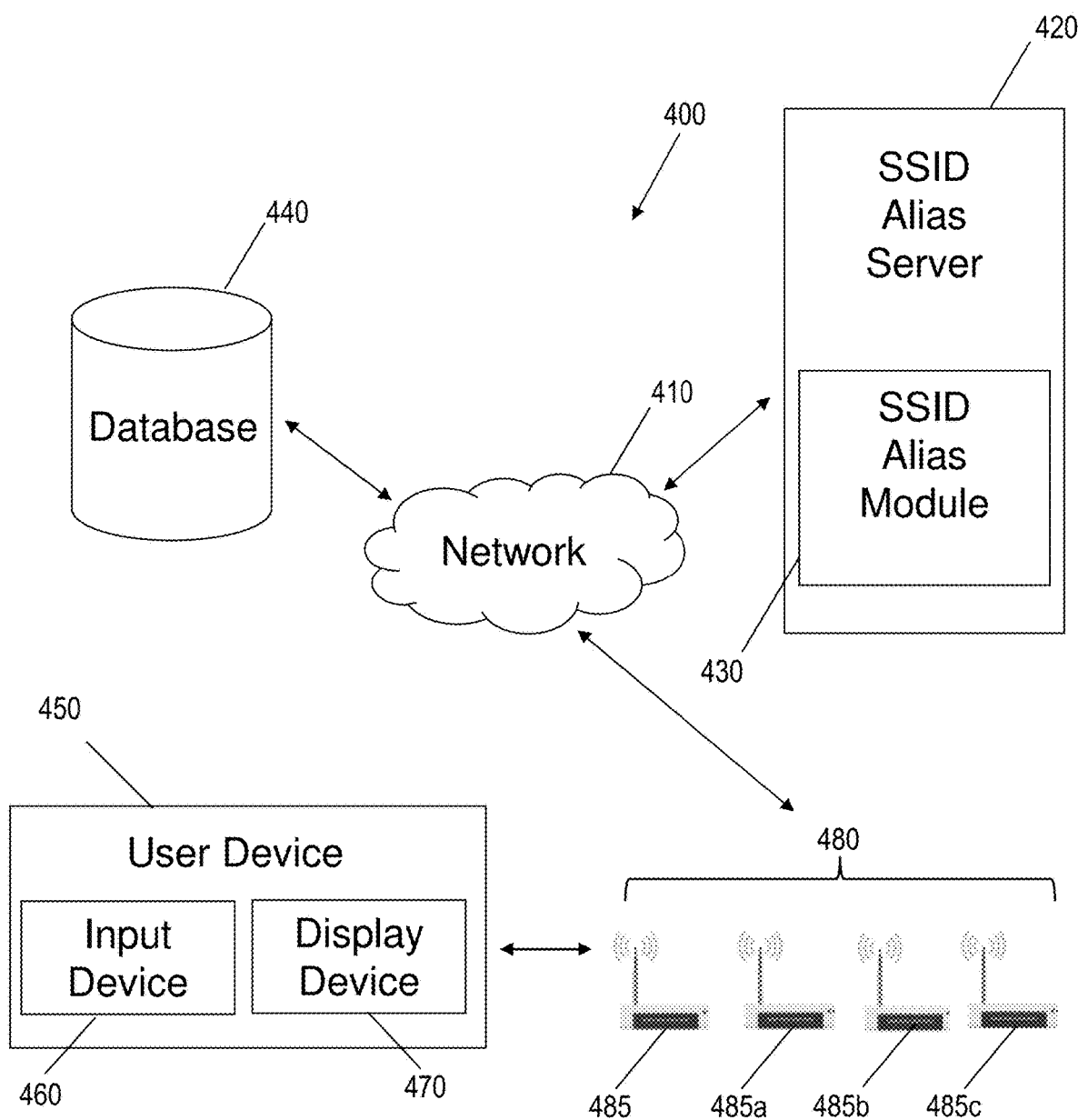
FIG. 2 shows a block diagram of an exemplary environment in accordance with aspects of the invention.

FIG. 2 shows a block diagram of an exemplary environment 400 in accordance with aspects of the invention. In embodiments, the environment 400 includes a network 410, a SSID alias server 420, a database 440, and a user device 450 having an input device 460 and a display device 470. In further embodiments, the environment 400 includes the wireless network 480 which includes the access points 485, 485a, 485b, 485c.

In embodiments, the user device 450 includes one or more components of the computer system 12 of FIG. 1. In embodiments, the user device 450 may be a smartphone, laptop computer, desktop computer, smart watch, tablet computer, for example. In embodiments, the input device 460 includes a mouse, a keyboard, and a microphone, amongst other input device examples. In embodiments, the display device 470 is a screen which displays information to the user.

In embodiments, the user device 450 joins the wireless network 480 by connecting to an access point of the access points 485, 485a, 485b, 485c to access the Internet. Examples of a wireless network 480 include a wireless network in a user's home, a public place, and/or any other setting. As a more specific example, the wireless network 480 is in a shopping mall. In embodiments, the wireless network 480 is either open or password protected. In embodiments, the access points 485, 485a, 485b, 485c include wireless routers, wireless repeaters, and mesh devices, amongst other devices which allow access to the wireless network 480.

In embodiments, the SSID alias server 420 includes a SSID alias module 430, which comprises one or more program modules such as program modules 42 described with respect to FIG. 1. In embodiments, the SSID alias server 420 includes additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

The network 410 comprises one or more computer networks, such as one or more of a LAN, WAN, and the Internet. In one embodiment, the network 410 is representative of a cloud computing environment.

In embodiments, the SSID alias module 430 allows for a solution to wireless network attacks by preventing a user device from impersonating another user device to join the wireless network 480. In embodiments, a SSID is a name included in packets of the wireless network 480. More specifically, the SSID is a name of the wireless network 480. As an example, when a user sets up the wireless network 480 in their home, the SSID of the wireless network 480 distinguishes a user's wireless home network from other wireless networks in a user's neighborhood. In this example, the SSID may be "Home" to signify the wireless network 480 at the user's home. In another example, the SSID may be "Guest" for guests over the user's home.

In embodiments, the wireless network 480 is vulnerable to certain attacks by users who join the wireless network 480 by impersonating another user device which already has joined the wireless network 480. As an example, a user device impersonating another user device joins the wireless network 480 to eavesdrop on communications occurring in the wireless network 480 to obtain passwords from other users of the wireless network 480. As another example, a user device impersonates another user device to eavesdrops to obtain banking credentials from users of the wireless network 480. In another example, the user device impersonates another user device to spread malware to attack the wireless network 480. A specific type of attack on the wireless network 480 is a deauthorization (deauther) attack. In a deauther attack, the attack prevents all devices, e.g., user device 450, from connecting to a given SSID. As an example, a user device is unable to connect to the wireless network 480 because the SSID, e.g., home, of the wireless network 480 is unavailable for selection by the user.

In embodiments, another type of specific wireless network attack is a flooding attack. In a flooding attack, the wireless network 480 is unable to operate because packets of information are flooding the wireless network 480. These packets of information overwhelm the wireless network 480, thereby preventing a user device from getting a response from the wireless network 480. In embodiments, another type of wireless network attack is a Man in Middle (MiM) attack. In a MiM attack, a user device impersonates a name of an actual SSID. When a user device connects to this SSID, the impersonating user device intercepts a user's communications to a server. In a MiM attack, the impersonating user device continues to forward the communications to the appropriate servers to make it appear that the SSID is valid. In embodiments, the SSID alias server 420 prevents the impersonating user device from joining the wireless network 480 by preventing the impersonating user device from impersonating another user device which has already joined the wireless network 480.

Figure 3A:
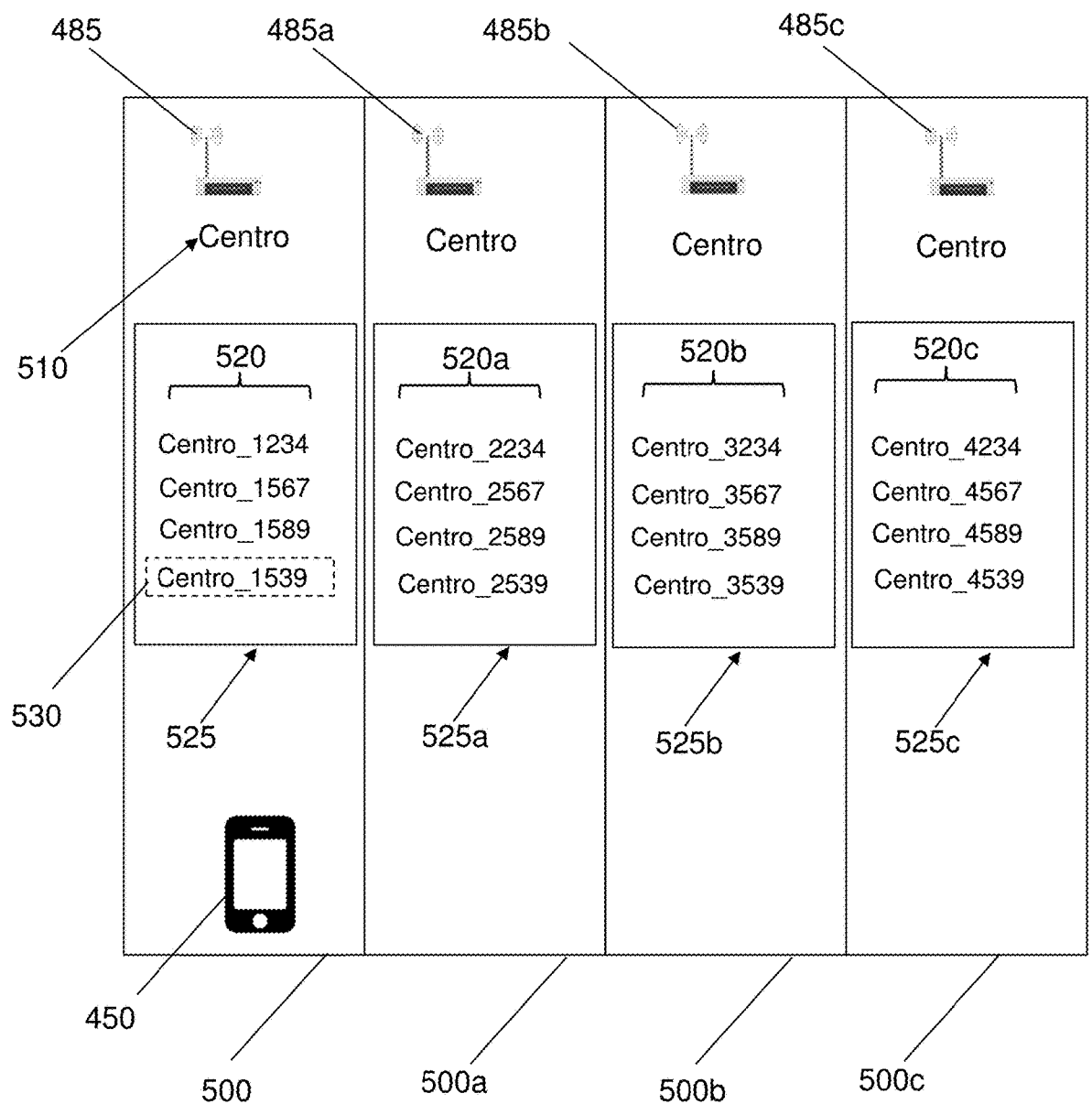
FIGS. 3A and 3B shows a SSID alias tracking of a user device in accordance with aspects of the invention.
Figure 3B:
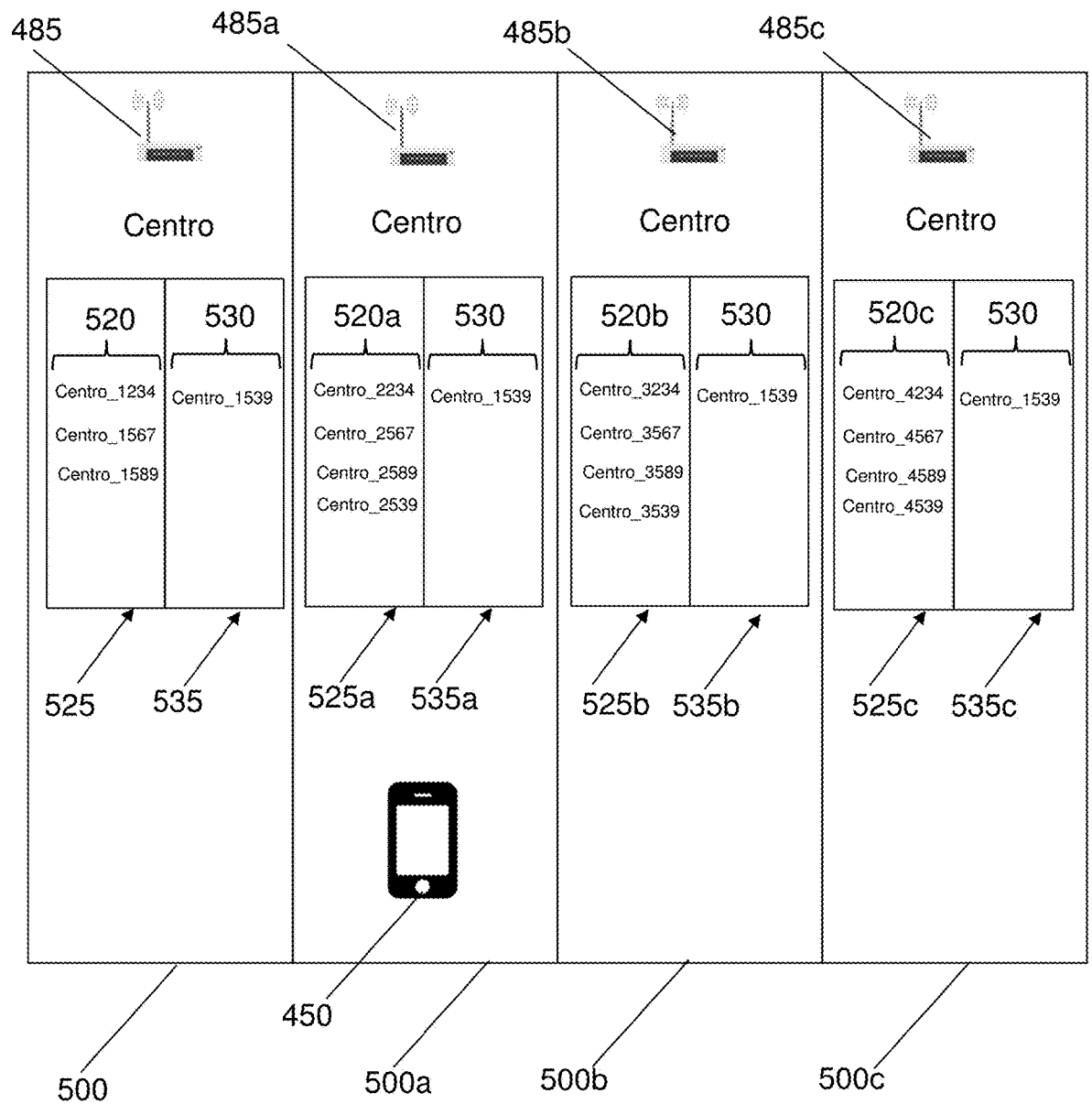

FIGS. 3A and 3B illustrate a SSID alias tracking of a user device 450 at locations 500, 500a, 500b, 500c, in accordance with aspects of the invention. FIGS. 3A and 3B are described with reference to elements depicted in FIG. 2. In embodiments, the locations 500, 500a, 500b, 500c are locations within a geographic area. An example of an area is a shopping mall, a public park, a sports arena and/or plurality of buildings in an office park, amongst other examples. As a more specific example, the locations 500, 500a, 500b, 500c are different stores within the shopping mall, or different sections within a sports arena, amongst other examples. In embodiments, the user is a consumer, a patron, and/or a visitor of the geographic area, amongst other examples.

In embodiments, the locations 500, 500a, 500b, 500c include the access points 485, 485a, 485b, 485c, which allow the user device 450 to join the wireless network 480. As shown in FIG. 3A, the wireless network 480 has the SSID 510 of "Centro." In embodiments, the user device 450 sends a request to an access point in the location of the user device 450 to join the wireless network 480. Specifically, the user device 450 sends a connection request to an access point of the access points 485, 485a, 485b, 485c. As an example, as shown in FIG. 3A, the user device 450 sends a request to the access point 485, since access point 485 is within the location 500 of the user device 450. In this way, the user device 450 accesses the wireless network 480 by connecting to an access point of the access points 485, 485a, 485b, 485c. In embodiments, the SSID alias module 430 receives the request as data from the access point of the access points 485, 485a, 485b, 485c through the network 410 in response to a user sending the request using the input device 460 of the user device 450.

In response to receiving the data which includes the request from an access point of the access points 485, 485a, 485b, 485c, the SSID alias module 430 obtains the SSID aliases 520, 520a, 520b, 520c from the database 440. In embodiments, the SSID alias module 430 generates SSID aliases 520, 520a, 520b, 520c. In further embodiments, the SSID alias module 430 generates SSID aliases 520, 520a, 520b, 520c randomly. In even further embodiments, each SSID alias is unique and does not match another SSID alias of the SSID aliases 520, 520a, 520b, 520c. As an example, the SSID aliases each have different numbers, e.g., Centro_1234, Centro_1567, Centro_1589, and Centro_1539. In embodiments, the SSID alias module 430 transmits the SSID aliases 520, 520a, 520b, 520c to an access point of the access points 485, 485a, 485b, 485c as lists 525, 525a, 525b, 525c containing the SSID aliases 520, 520a, 520b, 520c for selection by the user device 450. In embodiments, a SSID alias of the SSID aliases 520, 520a, 520b, 520c is an alternative name for the SSID 510 of the wireless network. As an example, the SSID 510 for the locations 500, 500a, 500b, 500c is "Centro," while the SSID aliases are alternative names for Centro, e.g., Centro_1234, Centro_1567, Centro_1589, and Centro_1539. By having an alias for the SSID 510, an unauthorized user is unaware of the actual SSID 510, i.e., name, of the wireless network 480, which makes joining the wireless network 480 more difficult for the unauthorized user.

In embodiments, the SSID alias module 430 obtains a predefined number of SSID aliases 520, 520a, 520b, 520c for each access point of the access points 485, 485a, 485b, 485c. As an example, as shown in FIG. 3A, the SSID alias module 430 obtains four SSID aliases for the SSID aliases 520 at location 500. In further embodiments, the SSID alias module 430 obtains 10 or 20 SSID aliases, amongst other examples.

Continuing with FIG. 3A, the SSID "Centro_1234" of the SSID aliases 520 in the list 525 is a first alias for connecting to the access point 485, while the remaining SSID aliases of "Centro_1567," "Centro_1589," and "Centro_1539," of SSID aliases 510 in the list 525 represent remaining aliases for connecting to the same access point 485. In this way, a user accesses the wireless network 480 by connecting to the access point 485 by selecting any one of the aliases in the SSID aliases 510 in the list 525, i.e., by selecting Centro_1234, Centro_1567, Centro_1589, or Centro_1539. In embodiments, the SSID alias module 430 obtains the SSID aliases 520a as a list 525a for access point 485a, the SSID aliases 520b as a list 525b for access point 485b, and the SSID aliases 520c as a list 525c for access point 485c. In embodiments, the list 525a of the SSID aliases 520a include Centro_2234, Centro_2567, Centro_2589, and Centro_2539. In further embodiments, the SSID aliases 520b includes Centro_3234, Centro_3567, Centro_3589, and Centro_3539. In even further embodiments, the SSID aliases 520c includes Centro_4234, Centro_4567, Centro_4589, and Centro_4539.

In embodiments, in response to obtaining the SSID aliases 520, 520a, 520b, 520c, the SSID alias module 430 propagates the SSID aliases 520, 520a, 520b, 520c as lists 525, 525a, 525b, 525c to the access points 485, 485a, 485b, 485c. In embodiments, the access points 485, 485a, 485b 485c sends the SSID aliases 520, 520a, 520b, 520c to the user device 450 for display on the display device 470 of the user device 450. In this manner, the SSID alias module 430 causes the list 525 of the SSID aliases 520, 520a, 520b, 520c to be displayed on the display device 470 of the user device 450. In embodiments, the user selects a SSID alias of the SSID aliases 520, 520a, 520b, 520c from the list 525 using the user device 450. In embodiments, the user device scans for the SSID aliases 520, 520a, 520b, 520c and selects an SSID alias from an access point. As an example, the user device selects the SSID alias 530, which is "Centro_1539." In embodiments, the SSID alias module 430 receives the selected SSID alias 530 from the access point of the access points 485, 485a, 485b, 485c through the network 410. In embodiments, in response to selecting the selected SSID alias 530, the user device 450 joins the wireless network 480 through the access point 485. In this way, In embodiments, each SSID alias of the SSID aliases 520, 520a, 520b, 520c has specific configurations which include rules and policies for features available to the user device 450 in using the wireless network 480. As an example, the SSID alias "Centro_2234" of the SSID aliases 520a has a rule which prevents a user device 450 from communicating with other devices who are joining the wireless network 480 by selecting other SSID aliases, e.g., Centro_2234. As an example, even though the user device 450 is using the wireless network 480 by using the Centro_2234 alias of the SSID aliases 520, the user device 450 is still unable to communicate with another user device using SSID alias Centro_2234. In this way, even if an unauthorized user joins the wireless network 480 by selecting a SSID alias of the of the SSID aliases 520, 520a, 520b, 520c, the unauthorized user is unable to eavesdrop on other devices which belong to the wireless network 480 because each SSID alias has a specific configuration. In embodiments, another rule is that each SSID alias allows a maximum connection of a single device. As an example, the SSID alias Centro_2234 has a configuration which prevents more than one device from using this SSID alias. In embodiments, an administrator sets the rules for each SSID alias of the SSID aliases 520, 520a, 520b, 520c.

In embodiments, the SSID alias module 430 receives a selected SSID alias out of the SSID aliases from an access point of the access points 485, 485a, 485b, 485c, with the selected SSID alias having been selected by the user device 450. In embodiments, in response to receiving the selected SSID alias 530, the SSID alias module 430 sends a password to the access point so that the user device 450 connects to the wireless network 480. As an example, the SSID alias module 430 sends a password to the access point 485 in the location 500 so that the user device 450 connects to the access point 485. In embodiments, each SSID alias of the SSID aliases 520, 520a, 520b, 520c has a specific password for joining the wireless network 480. In alternative embodiments, the user device 450 pairs to the access point of the access points 485, 485a, 485b, 485c, thereby allowing the user device 450 to join the wireless network 480 without the need for a password to join the wireless network 480. An example of pairing is wireless fidelity (Wi-Fi) protected setup (WPS), amongst other examples. In embodiments, the SSID alias module 430 receives a media access control (MAC) address from the access point which the user device 450 is in connection with.

In embodiments, in response to receiving the MAC address, the SSID alias module 430 creates a record grouping the selected SSID alias and the MAC address together within the database 440. In this way, the SSID alias module 430 assigns the selected SSID alias 530 to the user device 450 by saving the MAC address of the user device 450 together with the selected SSID alias 530 in the database 440. In embodiments, assigning a SSID alias to the user device 450 allows the SSID alias module 430 to identify the user device 450 in response to the user device 450 connecting to another access point of the access points 485, 485a, 485b, 485c.

Referring to FIG. 3B, in response to receiving the selected SSID alias 530, the access point removes (hides) the selected SSID alias 530, e.g., Centro_1539, from the list 525. Specifically, an access point hides the selected SSID alias 530 by removing the selected SSID alias 530 from a list of the lists 525, 525a, 525b, 525c and adding it to a hidden list. In embodiments, each access point of the access points 485, 485a, 485b, 485c includes a hidden list of the hidden lists 535, 535a, 535b, 535c. As shown in FIG. 3B, the SSID alias Centro_1539 is no longer present in the list 525. In this way, the selected SSID alias 530 is no longer visible not only to other user devices in location 500, but also to other user devices in locations 500a, 500b, 500c. Accordingly, the hiding the SSID alias prevents another user device from impersonating the user device 450 by hiding the selected SSID alias 530.

Referring to FIG. 3B, in response to hiding the selected SSID alias 530, the SSID alias module 430 propagates the selected SSID alias 530 to remaining access points of the access points 485, 485a, 485b, 485c in the wireless network 480. In embodiments, the remaining access points hide the selected SSID alias by adding the selected SSID alias to the hidden list of the hidden lists 535, 535a, 535b, 535c. As shown in FIG. 3B, each hidden list of the hidden lists 535, 535a, 535b, 535c includes the selected SSID alias 530 in response to receiving the selected SSID alias 530 from the SSID alias module 430. In this way, the SSID alias module 430 sends the selected SSID alias to the remaining access points of the wireless network by adding the selected SSID alias to a hidden list of the hidden lists 535, 535a, 535b, 535c.

In embodiments, as the user device 450 moves from a location, e.g., location 500 to location 500a, the SSID alias module 430 tracks the user device 450 using the selected SSID alias 530. As an example, the user device moves from location 500 in FIG. 3A to location 500a in FIG. 3B. At the location 500a, the user device 450 sends a request to the access point 485a. In embodiments, in response to receiving the request from the access point 485a, the SSID alias module 430 retrieves the MAC address from the access point 485a. The SSID alias module 430 compares this MAC address to the MAC addresses in the database 440. In response to finding a match to a MAC address in the database 440, the SSID alias module 430 sends a password to the access point 485a in the location 500a so that the user device 450 connects to the access point 485a. In alternative embodiments, the user device 450 pairs to the access point 485a, thereby allowing the user device 450 to join the wireless network 480.

In embodiments, the SSID alias module 430 tracks the user device 450 by receiving SSID alias usage data from the access points 485, 485a, 485b, 485c through the network 410. In embodiments, the SSID alias usage data includes which SSID alias is in use at which access point.

In embodiments, in response to receiving the SSID alias usage data from the access points, the SSID alias module 430 analyzes the received SSID usage data. In embodiments, the SSID alias module 430 performs the analysis by checking the record in the database 440 for a match between the SSID alias in the SSID alias usage data and the selected SSID alias 530 within the record in the database 440. In response to determining a match between the SSID alias in the SSID alias usage data and the selected SSID alias 530 within the record, the SSID alias module 430 determines that the user device 450 is in the location 500. In this way, the SSID alias module 430 determines a match between the SSID alias in the SSID alias usage data and the selected SSID alias in the record. In embodiments, uses for tracking the user device 450 includes marketing campaigns, e.g., marketing for an event at a public park on the user device 450. Further, tracking the user device 450 allows for determination of a location of people in case of emergencies. Additionally, tracking of the user device 450 allows for a security system to determine if people are in unauthorized locations.

In embodiments, the SSID alias module 430 tracks the user device 450, even if the user device 450 disconnects from an access point of the access points 485, 485a, 485b, 485c. In embodiments, the SSID alias module 430 performs probe requests by polling the access points 485, 485a, 485b, 485c to determine which of the SSID aliases 520, 520a, 520b, 520c are in use. In embodiments, by polling the access points, the SSID alias module 430 determines which SSID alias is in use, even if the user device 450 is no longer in connection with the wireless network 480. The SSID alias module 430 compares the SSID alias in use to the selected SSID alias 530 in the database 440. In response to the SSID alias in use matching the selected SSID alias 530, the SSID alias module 430 determines that the user device 450 is in the location of this access point, thereby tracking the user device 450, even though the user device 450 is not in connection with the wireless network 480.

In embodiments, the SSID alias module 430 includes policies which control access to the wireless network 480. In embodiments, a policy deletes a SSID alias of SSID aliases 520, 520a, 520b, 520c and/or deletes the selected SSID alias 530. In further embodiments, the SSID alias module 430 includes a time-out policy, in which the SSID alias module 430 deletes a SSID alias after a certain time period lapses. In embodiments, the SSID alias module 430 deletes the SSID alias by sending a message to the access points 485, 485a, 485b, 485c to delete the selected SSID alias after a time period lapses. As an example, the SSID alias module 430 deletes the selected SSID alias 530 by sending a message to the access points 485, 485a, 485b, 485c through the network 410 after one hour of time lapses. In response to deleting the SSID alias, the access point will stop providing access to the user device 450. In this way, even if an unauthorized user gains access to the wireless network 480, the unauthorized user has a limited amount of time for accessing the wireless network 480. In this example, the user device 450 would need to send a request again to the access point in the location of the user device 450 to join the wireless network 480 since the selected SSID alias 530 is deleted. In this way, the SSID alias module 430 deletes a hidden SSID alias after a time period lapses. In embodiments, the policies of the SSID alias module 430 depend on an administrator's strategy, business rules, usage, data privacy laws, and a number of aliases per access point.

Figure 4:
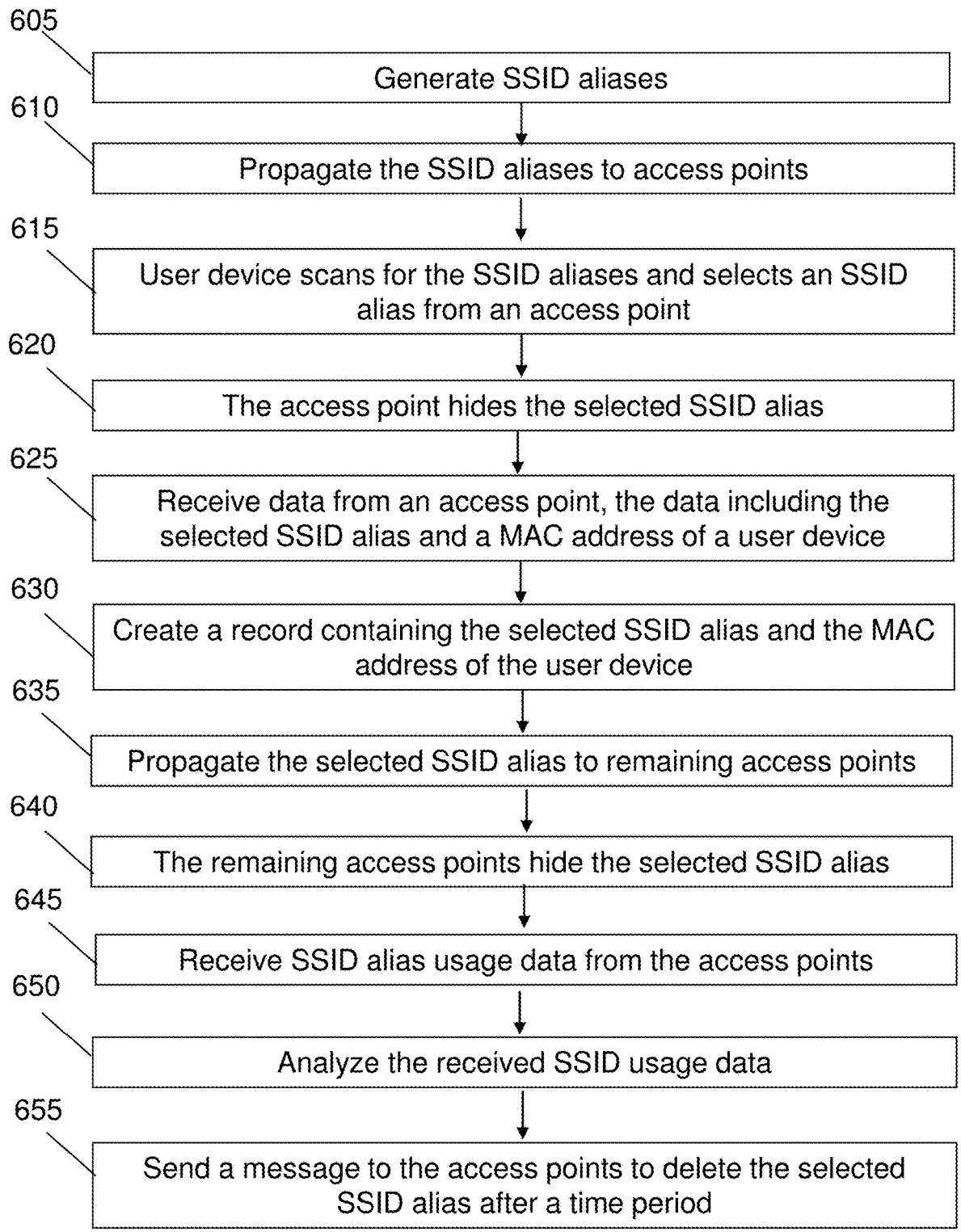
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIGS. 2, 3A, and 3B.

At step 605, the system generates SSID aliases. In embodiments, and as described with respect to FIGS. 2, 3A, and 3B, the SSID alias module 430 generates the SSID aliases 520, 520a, 520b, 520c randomly and stores them in the database 440 for later retrieval.

At step 610, the system propagates the SSID aliases to access points. In embodiments, and as described with respect to FIGS. 2, 3A, and 3B, the SSID alias module 430 propagates the SSID aliases 520, 520a, 520b, 520c to the access points 485, 485a, 485b, 485c through the network 410.

At step 615, a user device scans for the SSID aliases and selects an SSID alias from an access point. In embodiments, and as described with respect to FIGS. 2, 3A, and 3B, the user device 450 scans for the SSID aliases 520, 520a, 520b, 520c in a location of the locations 500, 500a, 500b, 500c, which include the access points 485, 485a, 485b, 485c. In embodiments, the user device selects an SSID alias from a list of the lists 525, 525a, 525b, 525c.

At step 620, the access point hides the selected SSID alias. In embodiments, and as described with respect to FIGS. 2, 3A, and 3B, an access point of the access points 485, 485a, 485b, 485c hides the selected SSID alias by adding the selected SSID alias to a hidden list of the hidden lists 535, 535a, 535b, 535c.

At step 625, the system receives data from an access point, the data including the selected SSID alias and a MAC address of a user device. In embodiments, and as described with respect to FIGS. 2, 3A, and 3B, the SSID alias module 430 receives data from an access point of the access points 485, 485a, 485b, 485c of a wireless network 480, and the data includes the selected SSID alias and the MAC address of the user device 450.

At step 630, the system creates a record containing the selected SSID alias and the MAC address of the user device. In embodiments, the SSID alias module 430 groups the selected SSID alias and the MAC address of the user device 450 together and saves this record in the database 440.

At step 635, the system propagates the selected SSID alias to remaining access points. In embodiments, and as described with respect to FIGS. 2, 3A, and 3B, the SSID alias module 430 propagates the selected SSID alias to remaining access points of the access points 485, 485a, 485b, 485c.

At step 640, the remaining access points hide the selected SSID alias. In embodiments, and as described with respect to FIGS. 2, 3A, and 3B, the remaining access points hide the selected SSID alias by adding the selected SSID alias to a hidden list of the hidden lists 535, 535a, 535b, 535c.

At step 645, the system receives SSID alias usage data from the access points. In embodiments, and as described with respect to FIGS. 2, 3A, and 3B, the SSID alias module 430 receives the SSID alias usage data from the access points 485, 485a, 485b, 485c through the network 410.

At step 650, the system analyzes the received SSID usage data. In embodiments, and as described with respect to FIGS. 2, 3A, and 3B, the SSID alias module 430 performs the analysis by checking the record in the database 440 for a match between the SSID alias in the SSID alias usage data and the selected SSID alias 530 within the record in the database 440.

At step 655, the system sends a message to the access points to delete the selected SSID alias after a time period. In embodiments, and as described with respect to FIGS. 2, 3A, and 3B, the SSID alias module 430 sends a message to the access points 485, 485a, 485b, 485c through the network 410 to delete the selected SSID alias after a time period lapses.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    generating, by a computing device, service set identifier (SSID) aliases;
    propagating, by the computing device, the SSID aliases to access points;
    hiding, by the computing device, a selected SSID alias by adding the selected SSID alias to a hidden list of an access point;
    receiving, by the computing device, data from the access point, the data including the selected SSID alias and a media access control (MAC) address of a user device;
    creating, by the computing device, a record containing the selected SSID alias and the MAC address of the user device;
    propagating, by the computing device, the selected SSID alias to remaining access points; and
    sending, by the computing device, a message to the access points to delete the selected SSID alias after a time period.

2. The method of claim 1, wherein the SSID aliases are generated randomly.

3. The method of claim 1, wherein the access points belong to a wireless network.

4. The method of claim 1, further comprising receiving a plurality of MAC addresses of the user device from the access point.

5. The method of claim 1, further comprising generating a password.

6. The method of claim 5, further comprising propagating the password to the access point for enabling wireless fidelity (Wi-Fi) protected setup (WPS) between the user device and the access point.

7. The method of claim 6, wherein the remaining access points hide the selected SSID alias by removing the selected SSID alias from a list containing the SSID aliases.

8. The method of claim 1, wherein the propagating the selected SSID alias to the remaining access points includes adding the selected SSID alias to the hidden list of the remaining access points.

9. The method of claim 1, further comprising creating a record grouping the selected SSID alias and a plurality of MAC addresses of the user device.

10. The method of claim 9, further comprising receiving the SSID alias usage data from the access points.

11. The method of claim 10, further comprising tracking the user device using the SSID alias usage data.

12. The method of claim 1, wherein each SSID alias is unique.

13. A computer program product comprising one or more computer readable storage media having program instructions collectively stored on the one or more computer readable storage media, the program instructions executable to:
generate service set identifier (SSID) aliases randomly;
propagate the SSID aliases to access points;
hide a selected SSID alias by adding the selected SSID alias to a hidden list of an access point;
receive data from the access point, the data including the selected SSID alias and a media access control (MAC) address of a user device;
create a record containing the selected SSID alias and the MAC address of the user device;
propagate the selected SSID alias to remaining access points; and
send a message to the access points to delete the selected SSID alias after a time period.

14. The computer program product of claim 13, further comprising tracking the user device using the selected SSID alias.

15. The computer program product of claim 14, wherein the tracking the user device includes receiving SSID alias usage data from the access points.

16. The computer program product of claim 15, wherein the tracking the user device includes comparing the SSID alias usage data to the record.

17. A system comprising:
a processor, a computer readable memory, one or more computer readable storage media, and program instructions collectively stored on the one or more computer readable storage media, the program instructions executable to:
generate service set identifier (SSID) aliases randomly;
propagate the SSID aliases to access points;
hide a selected SSID alias by adding the selected SSID alias to a hidden list of an access point;
receive data from the access point, the data including: the selected SSID alias of the SSID aliases; and a media access control (MAC) address of a user device that selected the selected SSID alias from a list of the SSID aliases;
create a record containing the selected SSID alias and the MAC address of the user device;
propagate the selected SSID alias to remaining access points;
receive SSID alias usage data from the access points; and
send a message to the access points to delete the selected SSID alias after a time period.

18. The system of claim 17, further comprising tracking the user device using the record and the SSID alias usage data.

19. The system of claim 17, wherein the access point hides the selected SSID alias from other user devices.

20. The system of claim 17, wherein the remaining access points hide the selected SSID alias from other user devices.

* * * * *